United States Patent
Nachenberg

(10) Patent No.: US 8,806,643 B2
(45) Date of Patent: Aug. 12, 2014

(54) IDENTIFYING TROJANIZED APPLICATIONS FOR MOBILE ENVIRONMENTS

(75) Inventor: Carey Nachenberg, Manhattan Beach, CA (US)

(73) Assignee: Symantec Corporation, Mountain View, CA (US)

( * ) Notice: Subject to any disclaimer, the term of this patent is extended or adjusted under 35 U.S.C. 154(b) by 190 days.

(21) Appl. No.: 13/358,413

(22) Filed: Jan. 25, 2012

(65) Prior Publication Data

US 2013/0191918 A1    Jul. 25, 2013

(51) Int. Cl.
   *G06F 21/00* (2013.01)
(52) U.S. Cl.
   USPC ............ 726/24; 726/22; 726/23; 726/25; 713/187; 713/188
(58) Field of Classification Search
   None
   See application file for complete search history.

(56) References Cited

U.S. PATENT DOCUMENTS

| | | | |
|---|---|---|---|
| 5,454,000 A * | 9/1995 | Dorfman | 714/54 |
| 7,373,519 B1 * | 5/2008 | Nachenberg et al. | 713/187 |
| 8,126,866 B1 * | 2/2012 | Barton et al. | 707/706 |
| 2007/0016953 A1 | 1/2007 | Morris et al. | |
| 2007/0240220 A1 | 10/2007 | Tuvell et al. | |
| 2008/0141371 A1 * | 6/2008 | Bradicich et al. | 726/23 |
| 2009/0282485 A1 | 11/2009 | Bennett | |
| 2009/0313700 A1 | 12/2009 | Horne | |
| 2010/0100963 A1 | 4/2010 | Mahaffey | |
| 2010/0275026 A1 | 10/2010 | McLean | |
| 2010/0313196 A1 | 12/2010 | De Atley et al. | |
| 2011/0041179 A1 | 2/2011 | Stahlberg | |
| 2011/0145920 A1 * | 6/2011 | Mahaffey et al. | 726/22 |
| 2012/0072988 A1 * | 3/2012 | Agrawal | 726/24 |
| 2012/0210431 A1 * | 8/2012 | Stahlberg et al. | 726/24 |
| 2013/0067577 A1 * | 3/2013 | Turbin et al. | 726/24 |

OTHER PUBLICATIONS

PCT International Search Report and Written Opinion for Counterpart Application PCT/US13/23127 dated Mar. 28, 2013, 14 pages.

* cited by examiner

*Primary Examiner* — Jung Kim
*Assistant Examiner* — Adrian Stoica
(74) *Attorney, Agent, or Firm* — Brill Law Office; Jeffrey Brill

(57) ABSTRACT

Trojanized apps for mobile environments are identified. Multiple apps for a specific mobile environment are obtained from one or more external sources. Code and digital signers are extracted from the apps and stored. For each given specific one of the obtained apps, the code of the specific app is compared to the code of other obtained apps, to determine whether the specific app 1) contains at least a predetermined threshold amount of code in common with one of the other apps, and 2) contains additional code not contained therein. If so, the digital signer of the specific app is compared to the digital signer of the other app. If it is also the case that the digital signer of the specific app is not the same as the digital signer of the other app, the specific app is identified as being trojanized.

14 Claims, 4 Drawing Sheets

IDENTIFYING TROJANIZED APPLICATIONS FOR MOBILE ENVIRONMENTS

TECHNICAL FIELD

This disclosure pertains generally to computer security, and more specifically to identifying trojanized applications for mobile environments.

BACKGROUND

Mobile computing devices such as smartphones and tablet computers are becoming more widely used every day. Android is an open-source, Linux based operating system for such mobile devices that is gaining an increasingly prevalent market share. A large community of developers write applications ("apps") that run on Android devices. Many of these apps are available either for purchase or for free through the online Android Market, which is run by Google. Android apps can also be downloaded from other online stores and additional third-party sites. With the open nature of the Android environment, anyone can create and distribute Android apps.

Because of its openness, the Android platform is vulnerable to an attack called trojanization. To implement this attack, a malicious party starts with a legitimate app, downloaded from an online store or other source. The attacker strips the app's digital signature, adds additional (malicious) code to the app, resigns the app with an anonymous digital certificate, and redistributes the now malicious app to unsuspecting users through one of the existing channels. This is known as trojanizing an app. In effect, the attacker is taking advantage of the openness of the Android development and distribution environment to hide malicious code in an existing, legitimate app. Users seeking to download and run the legitimate app are tricked into downloading the trojanized version. When the trojanized app runs on the user's Android device, the new code the attacker added can execute malicious functionality, such as stealing contact information, logging data input, sending fraudulent communications, etc.

It would be desirable to address this issue.

SUMMARY

A trojanized app management system identifies trojanized apps for mobile environments, such as trojanized Android apps. A plurality of apps for a specific mobile environment is obtained from one or more app stores and/or other third party sources. Code, digital signers and in some embodiments dates (e.g., publication dates) are extracted from the obtained apps and efficiently stored. For example, this data can be stored in an array of data structures representing apps, such that there is a separate element of the array associated with each one of the obtained apps. Extracting code from each app can take different forms in different embodiments, such as extracting the raw bytecode from all methods in all classes in the app, extracting the names of classes present in the app along with the names of each class's defined methods, extracting hashes of each method in each class of the app, extracting a flow graph describing possible paths of execution of the app, etc.

For each given specific one of the obtained apps, the code of the specific obtained app is compared to the code of other obtained apps of the plurality, to determine whether the specific obtained app 1) contains at least a predetermined threshold amount of code in common with one of the other obtained apps, and 2) contains additional code not contained therein. In one embodiment this process comprises comparing the code of the specific obtained app to the code of each of the other obtained apps. In another embodiment, this is optimized so that the code of the specific obtained app is only compared to the code of a subset of the other obtained apps. In this case, the subset consists of only those obtained apps with at least some code in common with the specific obtained app.

Responsive to determining that 1) the specific obtained app contains at least a predetermined threshold amount of code in common with another one of the obtained apps, and 2) the specific obtained app contains additional code not contained in the other obtained app, the digital signer of the specific app is compared to the digital signer of the other app. In one embodiment, the date of the specific app is also compared to the date of the other app. The specific app is identified as being a trojanized app, in response to determining that 1) the specific app contains at least a predetermined threshold amount of code in common with the other app, 2) the specific app contains additional code not contained in the other app, 3) the digital signer of the specific app is not the same as the digital signer of the other app, and (optionally) 4) the date of the specific app is later than the date of the other app.

Responsive to identifying a trojanized app, additional steps can be performed, such as flagging the trojanized app for manual inspection by a human analyst, queuing the trojanized app for automated malicious code analysis, transmitting information concerning the trojanized app to a centralized security component, blacklisting the trojanized app, etc.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
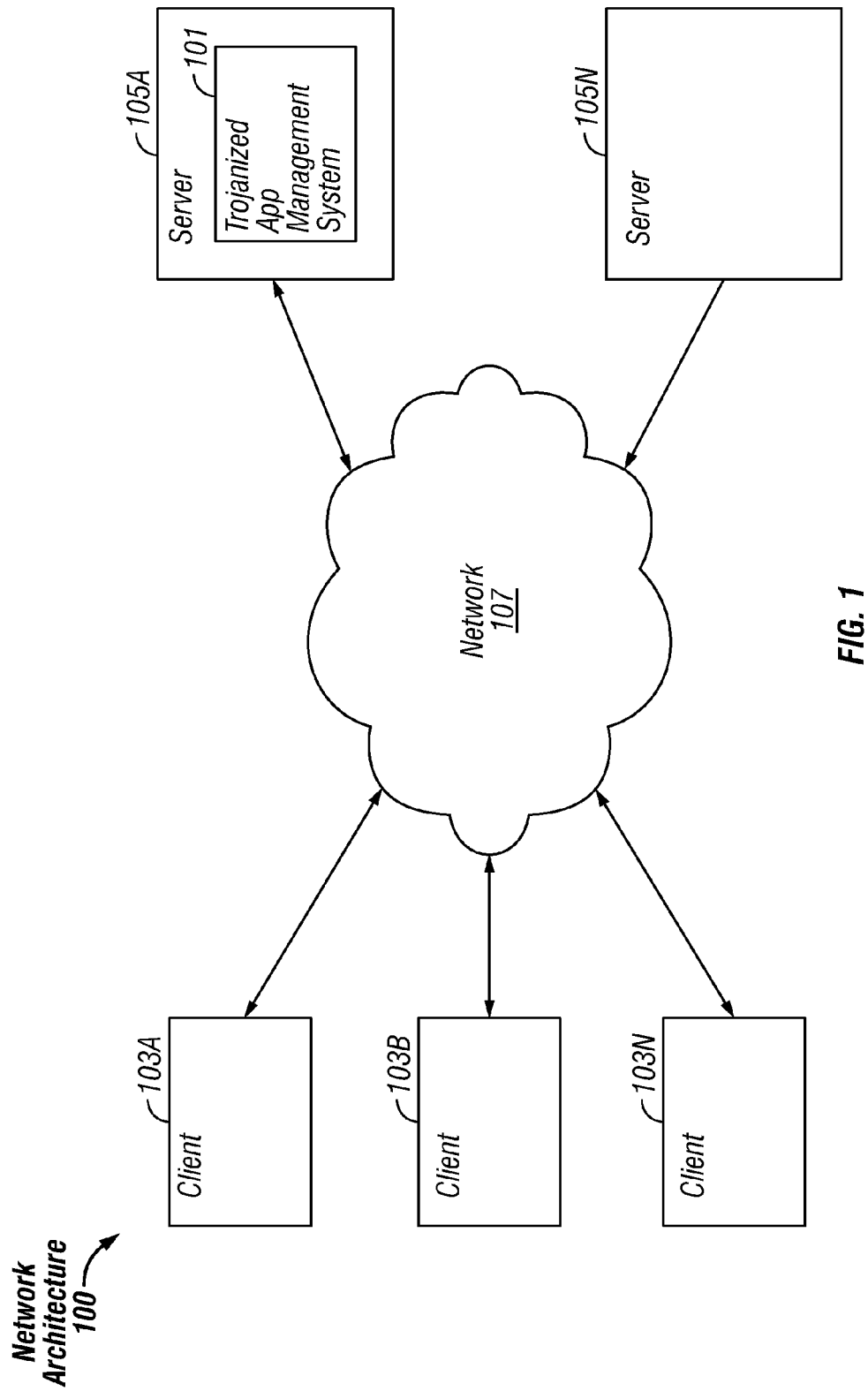
FIG. 1 is a block diagram of an exemplary network architecture in which a trojanized app management system can be implemented, according to some embodiments.

FIG. 1 is a block diagram illustrating an exemplary network architecture 100 in which a trojanized app management system 101 can be implemented. The illustrated network architecture 100 comprises multiple clients 103A, 103B and 103N, as well as multiple servers 105A and 105N. In FIG. 1, the trojanized app management system 101 is illustrated as residing on server 105A. It is to be understood that this is an example only, and in various embodiments various functionalities of this system 101 can be instantiated on a server 105, a client 103, or can be distributed between multiple clients 103 and/or servers 105.

Clients 103 and servers 105 can be implemented using computer systems 210 such as the one illustrated in FIG. 2 and described below. The clients 103 and servers 105 are communicatively coupled to a network 107, for example via a network interface 248 or modem 247 as described below in conjunction with FIG. 2. Clients 103 are able to access applications and/or data on servers 105 using, for example, a web browser or other client software (not shown).

Although FIG. 1 illustrates three clients and two servers as an example, in practice many more (or fewer) clients 103 and/or servers 105 can be deployed. In one embodiment, the network 107 is in the form of the Internet. Other networks 107 or network-based environments can be used in other embodiments.

Figure 2:
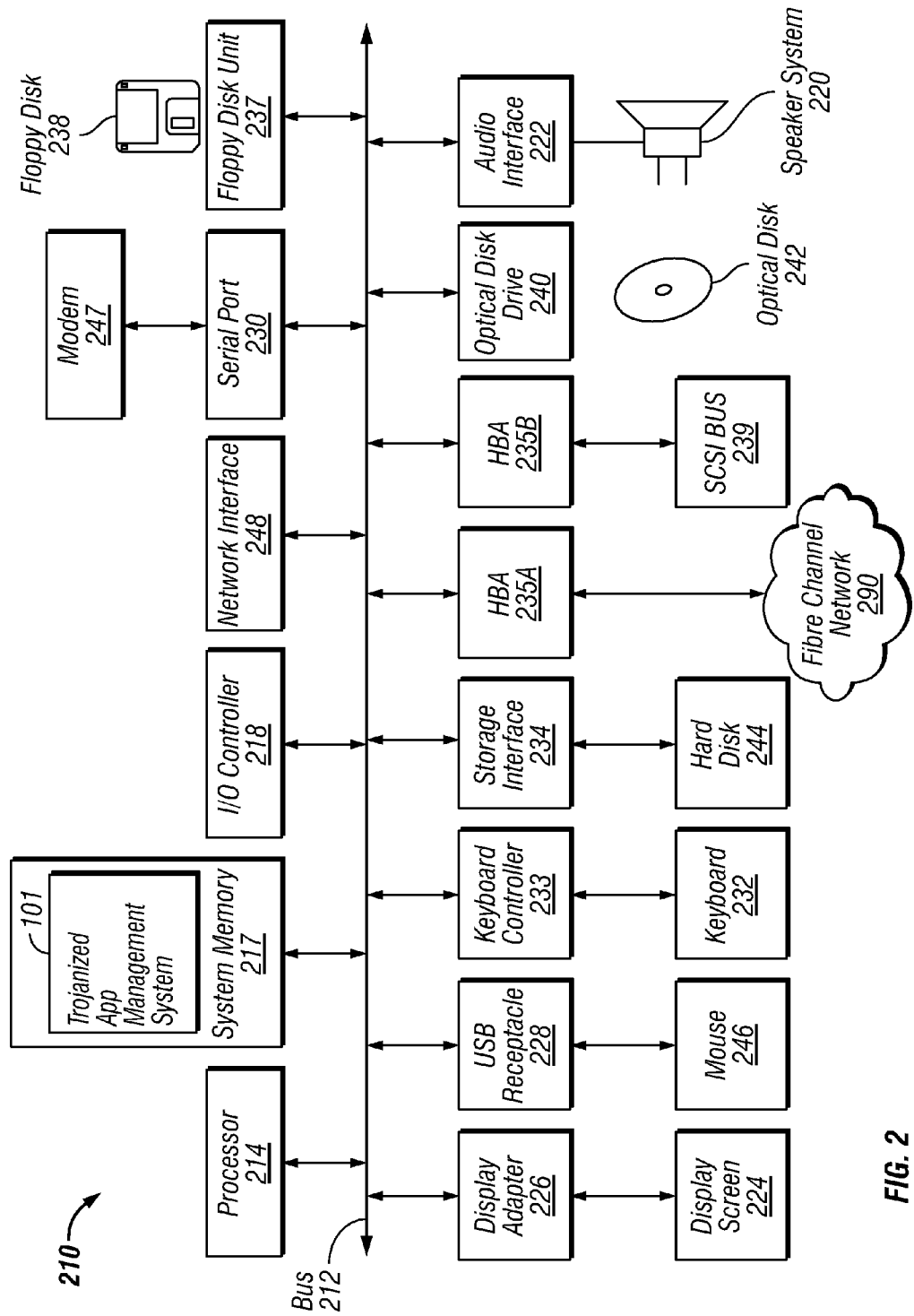
FIG. 2 is a block diagram of a computer system suitable for implementing a trojanized app management system, according to some embodiments.

FIG. 2 is a block diagram of a computer system 210 suitable for implementing a trojanized app management system 101. Both clients 103 and servers 105 can be implemented in the form of such computer systems 210. As illustrated, one component of the computer system 210 is a bus 212. The bus 212 communicatively couples other components of the computer system 210, such as at least one processor 214, system memory 217 (e.g., random access memory (RAM), read-only memory (ROM), flash memory), an input/output (I/O) controller 218, an audio output interface 222 communicatively coupled to an external audio device such as a speaker system 220, a display adapter 226 communicatively coupled to an external video output device such as a display screen 224, one or more interfaces such as serial ports 230, Universal Serial Bus (USB) receptacles 230, parallel ports (not illustrated), etc., a keyboard controller 233 communicatively coupled to a keyboard 232, a storage interface 234 communicatively coupled to at least one hard disk 244 (or other form(s) of magnetic media), a floppy disk drive 237 configured to receive a floppy disk 238, a host bus adapter (HBA) interface card 235A configured to connect with a Fibre Channel (FC) network 290, an HBA interface card 235B configured to connect to a SCSI bus 239, an optical disk drive 240 configured to receive an optical disk 242, a mouse 246 (or other pointing device) coupled to the bus 212 e.g., via a USB receptacle 228, a modem 247 coupled to bus 212, e.g., via a serial port 230, and a network interface 248 coupled, e.g., directly to bus 212.

Other components (not illustrated) may be connected in a similar manner (e.g., document scanners, digital cameras, printers, etc.). Conversely, all of the components illustrated in FIG. 2 need not be present. The components can be interconnected in different ways from that shown in FIG. 2.

The bus 212 allows data communication between the processor 214 and system memory 217, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 244, optical disk 242) and loaded into system memory 217 and executed by the processor 214. Application programs can also be loaded into system memory 217 from a remote location (i.e., a remotely located computer system 210), for example via the network interface 248 or modem 247. In FIG. 2, the trojanized app management system 101 is illustrated as residing in system memory 217. The workings of the trojanized app management system 101 are explained in greater detail below in conjunction with FIG. 3.

The storage interface 234 is coupled to one or more hard disks 244 (and/or other standard storage media). The hard disk(s) 244 may be a part of computer system 210, or may be physically separate and accessed through other interface systems.

The network interface 248 and or modem 247 can be directly or indirectly communicatively coupled to a network 107 such as the Internet. Such coupling can be wired or wireless.

Figure 3:
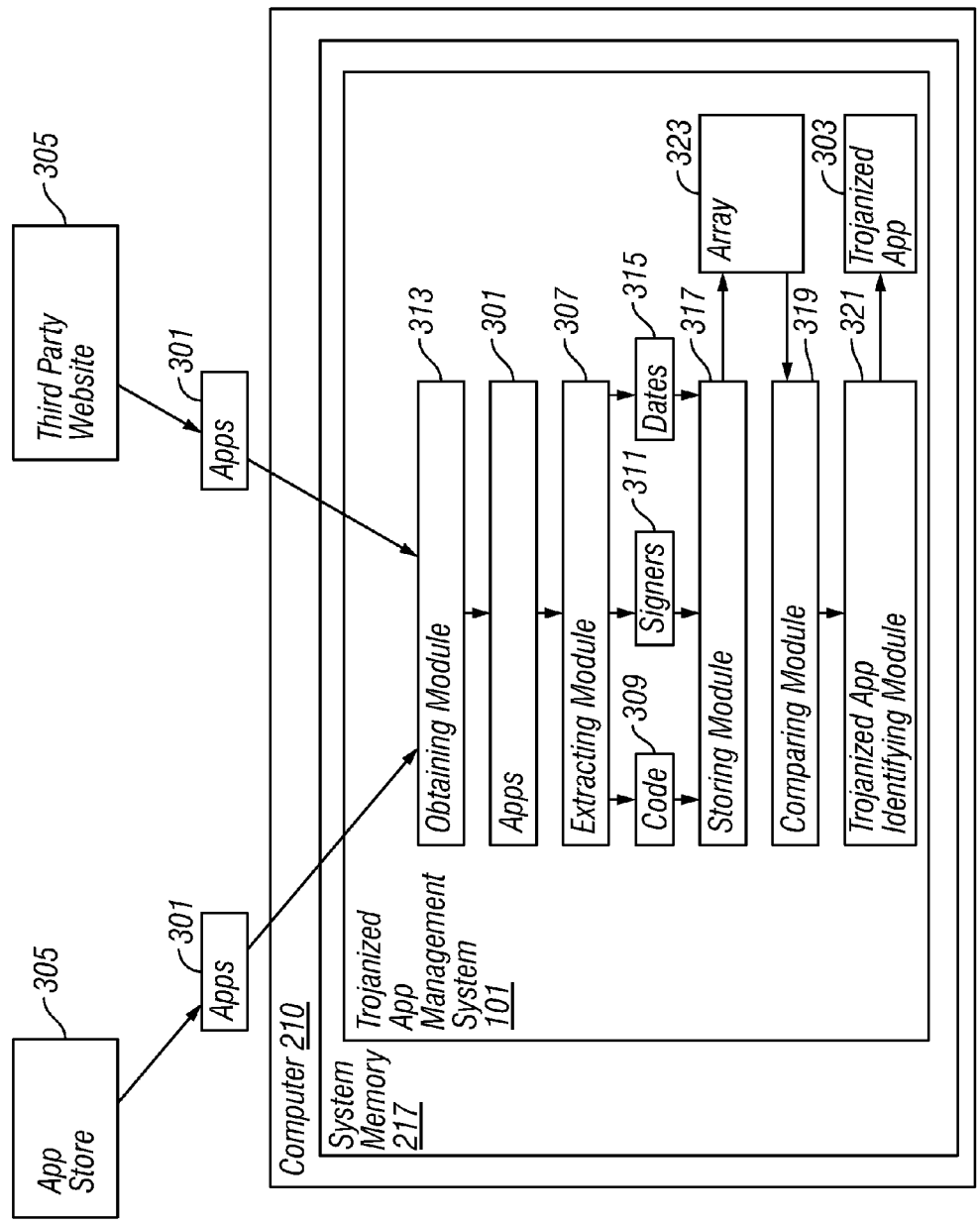
FIG. 3 is a block diagram of the operation of a trojanized app management system, according to some embodiments.

FIG. 3 illustrates the operation of a trojanized app management system 101, according to some embodiments. As described above, the functionalities of the trojanized app management system 101 can reside on a client 103, a server 105, or be distributed between multiple computer systems 210, including within a cloud-based computing environment in which the functionality of the trojanized app management system 101 is provided as a service over a network 107. It is to be understood that although the trojanized app management system 101 is illustrated in FIG. 3 as a single entity, the illustrated trojanized app management system 101 represents a collection of functionalities, which can be instantiated as a single or multiple modules as desired (an instantiation of specific, multiple modules of the trojanized app management system 101 is illustrated in FIG. 3). It is to be understood that the modules of the trojanized app management system 101 can be instantiated (for example as object code or executable images) within the system memory 217 (e.g., RAM, ROM, flash memory) of any computer system 210, such that when the processor 214 of the computer system 210 processes a module, the computer system 210 executes the associated functionality. As used herein, the terms "computer system," "computer," "client," "client computer," "server," "server computer" and "computing device" mean one or more computers configured and/or programmed to execute the described functionality. Additionally, program code to implement the functionalities of the trojanized app management system 101 can be stored on computer-readable storage media. Any form of tangible computer readable storage medium can be used in this context, such as magnetic or optical storage media. As used herein, the term "computer readable storage medium" does not mean an electrical signal separate from an underlying physical medium.

As illustrated in FIG. 3, a trojanized app management system 101 detects trojanized apps 303 by obtaining available apps 301 for a given mobile device environment and identifying those with specific characteristics relative to others, as described in detail below. In one embodiment, the mobile device environment is the Android environment, and the trojanized app management system 101 obtains Android apps 301 from one or more app stores and/or other third party sources 305. It is to be understood that the trojanized app management system 101 is not limited to operating within the Android environment, and in other embodiments can obtain and process apps 301 for other mobile device environments.

An app obtaining module 313 of the trojanized app management system 101 obtains multiple apps 301 for the given mobile device environment, for example Android apps 301, which are in the form of Android Application Package ("APK") files (a file format used to distribute and install Android apps 301). The app obtaining module 313 obtains the apps 301 from one or more external sources 305, such as app stores or other third party websites which make apps 301 available for download. In one embodiment, when the trojanized app management system 101 is activated, the app obtaining module 313 obtains all apps 301 that are available for download from one or more external sources 305. In one embodiment, app obtaining modules 313 run on user devices (e.g., smart phones, tablets) and identify and obtain new and/or unknown apps 301. The user device based app obtaining modules 313 submit the obtained apps 301 to the centrally located trojanized app management system 101 (running on, e.g., a server 105). This enables the trojanized app management system 101 to discover new apps 301 submitted from many different user devices (not illustrated) without having to crawl the Internet.

An extracting module 307 of the trojanized app management system 101 extracts code 309 to be analyzed from each obtained app 301. In this context, extracting code 309 can comprise extracting data concerning code 309, such as the names of methods or classes, computing hashes of classes and/or methods and using these hashes, or extracting actual executable code 309 itself. As used herein, the analysis of the code 309, and hence the code 309 that is extracted, can take different forms in different embodiments. In one embodiment, the extracting module 307 extracts the fully qualified name of each method used by the app 301 (i.e., the full prototype of the method, such as "float classa:methoda(int bar, float ack)"). In another embodiment, the extracting module 307 extracts the names of the classes in the app 301. In other embodiments, the extracting module 307 identifies methods (or classes) using an identifier other than name, such as a hash. In another embodiment, the extracting module extracts an entire block of machine/bytecode, and normalizes it. Normalizing extracted bytecode can involve, for example, normalizing indices that might vary in different executables, while still retaining the overall machine code (e.g., dalvik/java bytecode) semantics. In yet another embodiment, the extracting module 307 creates a flow graph of the possible paths of execution of the code 309 in the app 301.

The extracting module 307 also extracts the identity of the signer 311 of each app 301. Android apps 301 (and apps 301 for many other mobile environments) are signed by the distributing party (e.g., the developer). For example, the Android system requires that all apps 301 be digitally signed with a certificate whose private key is held by the developer of the app 301. The Android system will not install or run an app 301 that is not properly signed. However, the certificate used to sign an Android app 301 does not need to be signed by a certificate authority. In fact, it is typical for Android apps 301 to be signed with certificates that are self-signed by the distributing party.

In one embodiment, the extracting module 307 also obtains the date 315 that each app 301 (e.g., each APK file) was published (or first discovered, obtained, downloaded, etc.). Date information can be obtained, for example, from a time stamp in the header of the app 301. In another embodiment, dates 315 are not extracted or further processed.

As explained in more detail below, the data concerning the code 309 and signers 311 (and in one embodiment dates 315) of different apps 301 are compared, in order to identify trojanized apps 303. In order to facilitate this comparing, an extracted data storing module 317 of the trojanized app management system 101 stores the extracted data (code 309, signers 311 and optionally dates 315), for example in an array 323 (or in another format such as a database, table, list, etc.) in which each entry contains the extracted data for a specific app 301. In one embodiment, the extracted data storing module 317 stores the extracted data in an array 323 of objects of a class which includes the members 1) methods, 2) signer and (optionally) 3) date. For example, in an embodiment in which the app class is called APKInfo, the set of fully-qualified names of all of the methods from the app 301 is stored in APKInfo.methods. (The set of method names could comprise, for example, {void classa:methoda(int a), int classa:methodb(double b), void classb:methodc(void), void classb:methodd(char g)}.) The signer 311 of the app 301 is stored in APKInfo.signer, and the date 315 of publication (or discovery, etc.) is stored in APKInfo.date.

It is to be understood that the specific implementation of the storage of extracted data involves variable design parameters. For example, the format of the class (or other data structure) representing the information concerning an app 301, as well as the format of the array 323 (or other data structure) used to store the instances thereof can vary between embodiments. Further, as noted above, the specific data extracted from each app 301 can also vary between embodiments. For example, in some embodiments code 309 other than method names is extracted, such as class names, flow graphs, etc.

Once the data has been extracted from the obtained apps 301 and stored, it can be determined whether a specific one of the obtained apps 301 is a trojanized app 303, by comparing its extracted data to that of the other obtained apps 301 (or in some optimized embodiments to a subset of the others, as explained below). More specifically, a comparing module 319 of the trojanized app management system 101 compares data concerning the code 309 (e.g., method names, hashes, raw bytecode, etc.) extracted from a specific one of the obtained apps 301 to data concerning the code 309 of each of the other obtained apps 301. In one embodiment, by performing these comparisons, the comparing module 319 determines whether the specific one of the obtained apps 301 being analyzed for trojanization has the same code 309 as any one of the others, plus some additional code 309. For example, in an embodiment in which the extracted data concerning the code 309 is in the form of method names, the comparing module 319 determines whether the specific one of the apps 301 has all of the same methods as another one of the apps 301, plus one or more additional methods. In an embodiment in which class names are extracted rather than method names, it is determined whether the specific app 301 has the same classes as another app 301, plus one or more additional classes. Code 309 added to trojanize an existing app 301 need not be in the form of a new, separate class or method, but also can be appended onto or inserted into an existing method found in the original, legitimate app 301. To detect apps 301 that have been trojanized in this manner, the comparing module 319 can determine whether the specific app 301 contains the same classes and methods as another app 301, but with some additional code 309 present in one or more of the methods of the specific app 301. This scenario is also an indication of trojanization. Because a trojanized app 303 is created by adding malicious code to an existing, legitimate app 301, an app 301 that has the same code 309 as another app 301 plus some additional code 309 is considered suspicious if it is produced by a different author/signer.

In some embodiments, the specific app 301 being compared to the other apps 301 need not have all of the same code 309 as another one of the apps 301 to be flagged as suspicious, but instead at least a predetermined threshold of common code 309. The predetermined threshold can be in the form of a given percentage comprising a substantial majority (e.g., 85%, 90%, 95%, etc.), a critical subset of methods or classes, a critical core of functionality as determined by, e.g., a flow graph, etc. The additional code 309 in the app 301 flagged as being suspicious can comprise one or more additional methods or classes, one or more modified methods or classes, a predetermined threshold of additional or modified functionality, etc. Since many apps 301 use commonly available third party libraries (e.g., an advertising library, a user interface library, a communication library, etc.) to implement basic functionality, in some embodiments such libraries are excluded from consideration when determining whether the specific app 301 has a predetermined threshold of code 309 in common with another app 301.

If the comparison of the data concerning code 309 of the specific app 301 being analyzed for trojanization and the data concerning code 309 of another one of the apps 301 indicates that the specific app 301 is suspicious, the comparing module 319 also compares the signers 311 of the two apps 301, and, in some embodiments, also the dates 315. Because a trojanized app 303 is created by modifying a legitimate app 301, striping its signature, and resigning it, a trojanized app 303 can be expected to have a different signer 311 than the legitimate app 301 on which it is based. Additionally, because a trojanized app 303 is based on an underlying, pre-existing legitimate app 301, the trojanized app 303 typically has a later date 315. Thus, where an app 301 is considered suspicious based on the code 309 comparison, one or both of these additional comparisons is made. Where this indicates that the two apps 301 in question have different signers 311 (and in one embodiment also that the suspicious app 301 has a later date 315 than the other app 301), a trojanized app identifying module 321 of the trojanized app management system 101 identifies the specific app 301 being analyzed as a trojanized app 303. Thus, an app 301 that has the same code 309 as another app 301 (or at least a critical mass of common code 309), plus some additional code 309, and has a different signer 311 (and in one embodiment also a later publication date 315) is adjudicated as being a trojanized app 303. By comparing each specific obtained app 301 to the other obtained apps 301 in this manner, trojanized apps 303 are identified.

Where a trojanized app 303 is identified, various steps can be taken in response as desired. For example, the convicted app 303 can be flagged for manual inspection by a human analyst, queued for automated malicious code analysis, reported to a centralized security server (not illustrated), blacklisted, etc. In other words, the trojanized app management system 101 can act as a filter, which automatically identifies apps 301 with certain characteristics indicative of trojanization. The apps 301 convicted by the trojanized app management system 101 can subsequently be processed as desired, for example by subjecting them to further scrutiny and analysis, and/or taking steps to protect users from them.

To illustrate the operation of the trojanized app management system 101, several specific examples are now described in greater detail. It is to be understood that the implementation details described in these examples are illustrative only, and that different design choices can be made in other embodiments. In one specific embodiment, trojanized Android apps 303 are identified as follows.

Android apps 301 (as APK files) are downloaded from the various known App Store websites 305. A class APKInstance is used to represent specific ones of the downloaded APK files, and has the members 1) APKInstance.methods, 2) APKInstance.signer and 3) APKInstance.date, wherein methods is the set of the names of all the methods in the APK file, signer is the digital signer 311 of the APK file, and date is the publication date 315 of the APK file. Where n is the number of APK files in the collection, an array 323 of n APKInstance objects APKInfo[n] is allocated.

For each of the n APK files count=1 . . . n, the following information is extracted and stored in APKInfo[count]: 1) the set of the fully-qualified names of all methods from the APK file are stored in APKInfo[count].methods; 2) the digital signer 311 of the APK file is stored in APKInfo[count].signer; and 3) the publication date 315 of each APK file is stored in APKInfo[count].date.

Each APK file in the collection is then examined to determine whether it has been trojanized by comparing it to the other APK files as follows. Where i equals the APK file being examined and count equals each of the n APK files represented in APKInfo 1 . . . n, for count 1 . . . n, where count is not equal to i, APKInfo[i] is compared to APKInfo[count]. Where APKInfo[i].methods contains every fully-qualified method also found in APKInfo[count].methods, AND APKInfo[i].methods contains at least one additional method not found in APKInfo[count].methods, AND APKInfo[i].signer indicates a different digital signer 311 than APKInfo[count].signer, AND (optionally) APKInfo[i].date is later than APKInfo[count].date, THEN APKInfo[i] is adjudicated to be a trojanized version of APKInfo[count].

The above described embodiment can be modified to operate on the class level rather than the method level. In a class based version of the embodiment, an APK file being examined is checked to see if it contains every class (rather than method) of other APK files, plus at least one additional class. Whether examining methods or classes, these embodiments identify new APK files that contain a superset of code 309 from an original APK file (i.e., by having all the same code 309 plus some additional code 309), and are signed by a different signer 311 than the original APK file.

The above embodiments, whether method or class based in terms of code analysis, are of complexity $O(N^2)$, where N is the number of APK files to be analyzed. Optimizations can be made to reduce the time complexity (e.g., to $O(N)$), by decreasing the set of APK files to which a given APK file is compared. This can be done, for example, by only comparing an APK file to other APK files with code 309 (e.g., methods) in common, rather than to every other APK file in the collection.

For example, in one optimized embodiment, the array APKInfo[1 . . . n] is sorted by the number of methods in each element APKInfo[count].methods, from fewest methods to most (or by number of classes, or by amount of code 309 as indicated by flow graphing, etc.). A map (e.g., a hashmap) is created which maps each method that is in any APK file in the collection to the array 323 indices of each APK file that the method is in. Using the pre-built map data structure described above, the algorithm implemented by the pseudo-code in Table 1 can be used to efficiently identify trojanized APKs. It is to be understood that the pseudo-code in Table 1 shows a specific example of one possible embodiment which is optimized to reduce the time complexity.

TABLE 1

For each APK j in the sorted array of APKs (ordered by the
# of classes in the APK, from smallest to largest)
   Define temporary map that can map an APK index to a
count of methods
   For each method k in APK[j]
     Look up the list of indices (index[0]..[index[q-1]) of APKs that method k was found in the global map.
     For each index r (0<=r<q) that is greater than j,
bump up the count for that APK in temporary map:
temp_map[index[r]] ++;
   For each entry in temp_map
     If an entry has value equal to the number of
methods in APK[j], then the APK index # identified by the
key is a candidate for being a trojanized version of APK[j]
since it contains every method from APK[j].

It is to be understood that variations to the above described embodiment are possible. In general, the process can be optimized by comparing a specific app 301 to only a subset of the other apps 301 in the collection, based on the compared apps 301 having a requisite amount of code 309 in common, to avoid making comparisons between apps 301 that are not likely to detect trojanized apps 303.

Figure 4:
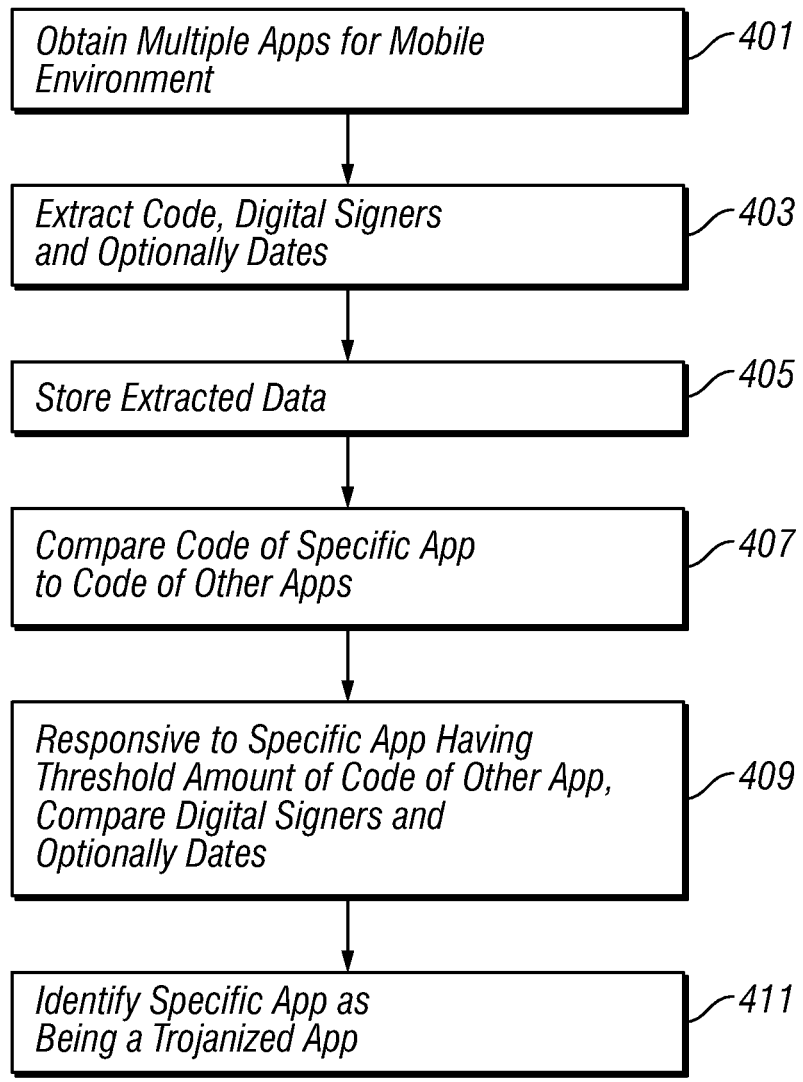
FIG. 4 is a flowchart of the operation of a trojanized app management system, according to some embodiments.

FIG. 4 illustrates steps of the operation of the trojanized app management system 101, according to some embodiments. The app obtaining module 313 obtains 401 multiple apps 301 for a specific mobile environment, from one or more external sources 305. The extracting module 307 extracts 403 1) data concerning code 309, 2) the identity of the digital signer 311, and optionally 3) the publication date 315, from each obtained app 301. The extracted data storing module 317 stores 405 the extracted data (code 309, digital signers 311 and optionally dates 315). For each given specific one of the obtained apps 301, the comparing module 319 compares 407 the data concerning code 309 of the specific app 301 to the data concerning code 309 of other obtained apps 301, to determine whether the specific app 301 1) contains at least a predetermined threshold amount of code 309 in common with one of the other apps 301, and 2) contains additional code 309 not contained in the other app 301 (e.g., the specific app 301 has a superset of the code 309 of the other app 301). Responsive to this being the case, the comparing module 319 further compares 409 the digital signer 311 of the specific app 301 to the digital signer 311 of the other app 301, and optionally the date 315 of the specific app 301 to the date 315 of the other app 301. The trojanized app identifying module 321 identifies 411 the specific app 301 as being a trojanized app 303, responsive to 1) the specific app 301 containing at least a predetermined threshold amount of code 309 in common with the other app 301, 2) the specific app 301 containing additional code 309 not contained in the other app 301, 3) the digital signer 311 of the specific app 301 not being the same as the digital signer 311 of the other app 301, and (optionally) 4) the date 315 of the specific app 301 being later than the date 315 of the other app 301.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the invention or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer implemented method for identifying trojanized applications (apps) for mobile environments, the method comprising the steps of:
   obtaining, by a computer, a plurality of apps for a specific mobile environment, from at least one external source;
   comparing data concerning code, the digital signer, and the date of a first specific one of the obtained apps to data concerning code and a digital signer of a second specific one of the obtained apps of the plurality of apps;
   based on the comparing, determining that the first specific one of the obtained apps contains: 1) at least a predetermined threshold amount of code contained in a second specific one of the obtained apps, 2) additional code not present in the second specific one of the obtained apps, 3) a different signer than the second specific one of the obtained apps, and 4) the date of the first specific one of the obtained apps is later than the date of the second specific one of the obtained apps; and
   in response to the determining, identifying the first specific one of the obtained apps as being a trojanized app.

2. The method of claim 1 further comprising:
   excluding libraries common across multiple apps from 1) comparing data concerning code of a first specific one of the obtained apps to data concerning code of at least one other obtained app, and 2) determining that the first specific one of the obtained apps contains: at least a predetermined threshold amount of code contained in a second specific one of the obtained apps and additional code not present in the second specific one of the obtained apps.

3. The method of claim 1, wherein obtaining, by a computer, a plurality of apps further comprises:
   for each specific obtained app, extracting data concerning code from the specific obtained app.

4. The method of claim 3 wherein extracting data concerning code from the specific obtained app further comprises:
   extracting a fully qualified name of each method used by the specific obtained app.

5. The method of claim 3 wherein extracting data concerning code from the specific obtained app further comprises:
   extracting a fully qualified name of each class used by the specific obtained app.

6. The method of claim 3 wherein extracting data concerning code from the specific obtained app further comprises:
   creating a flow graph describing possible paths of execution of the specific obtained app.

7. The method of claim 3 wherein extracting data concerning code from the specific obtained app further comprises:
   extracting raw bytecode from all methods in all classes in the app; and
   normalizing the extracted raw bytecode.

8. The method of claim 7 wherein extracting data concerning code from the specific obtained app further comprises:
   creating a hash of the normalized, extracted raw bytecode.

9. The method of claim 1 further comprising:
   for each specific obtained app, extracting an identity of a digital signer from the specific obtained app.

10. The method of claim 1 further comprising:
    for each specific obtained app, obtaining a date concerning the specific obtained app from a group of dates consisting of: a date the specific app was published, a date the specific app was discovered, a date the specific app was downloaded, and a date the specific app was obtained, and a date the specific app contains within its header.

11. The method of claim 1 further comprising:
    responsive to identifying the first specific one of the obtained apps as being a trojanized app, performing at least one additional step from a group of steps consisting of:
    flagging the trojanized app for manual inspection by a human analyst;
    queuing the trojanized app for automated malicious code analysis;

transmitting information concerning the trojanized app to a centralized security component; and blacklisting the trojanized app.

12. The method of claim 1 wherein:

the plurality of apps for the specific mobile environment further comprises a plurality of Android apps for the Android environment.

13. At least one non-transitory computer readable medium storing program code that, when loaded into computer memory and run by a processor, executes the following steps:

obtaining a plurality of apps for a specific mobile environment, from at least one external source;

comparing data concerning code, the digital signer, and the date of a first specific one of the obtained apps to data concerning code and a digital signer of a second specific one of the obtained apps of the plurality of apps;

based on the comparing, determining that the first specific one of the obtained apps contains: 1) at least a predetermined threshold amount of code contained in a second specific one of the obtained apps, 2) additional code not present in the second specific one of the obtained apps, 3) a different signer than the second specific one of the obtained apps, and 4) the date of the first specific one of the obtained apps is later than the date of the second specific one of the obtained apps; and in response to the determining, identifying the first specific one of the obtained apps as being a trojanized app.

14. A computer system for identifying trojanized apps for mobile environments, the computer system comprising:

computer memory;

a processor;

an app obtaining module residing in the computer memory, the app obtaining module to obtain a plurality of apps for a specific mobile environment, from at least one external source;

a comparing module residing in the computer memory, the comparing module to compare data concerning, the digital signer, and the date of a first specific one of the obtained apps to data concerning code and a digital signer of a second specific one of the obtained apps of the plurality of apps, and, based on the comparison determining that the first specific one of the obtained apps contains: 1) at least a predetermined threshold amount of code contained in a second specific one of the obtained apps, 2) additional code not present in the second specific one of the obtained apps, 3) a different signer than the second specific one of the obtained apps, and 4) the date of the first specific one of the obtained apps is later than the date of the second specific one of the obtained apps; and a trojanized app identifying module residing in the computer memory, the trojanized app identifying module being configured for identifying the first specific one of the obtained apps as being a trojanized app, in response to the determining.

* * * * *